United States Patent
Pan et al.

(10) Patent No.: US 11,184,295 B2
(45) Date of Patent: Nov. 23, 2021

(54) PORT MIRRORING BASED ON REMOTE DIRECT MEMORY ACCESS (RDMA) IN SOFTWARE-DEFINED NETWORKING (SDN) ENVIRONMENTS

(71) Applicant: VMware, Inc., Palo Alto, CA (US)

(72) Inventors: Feng Pan, Beijing (CN); Xu Wang, Beijing (CN); Qiong Wang, Beijing (CN); Donghai Han, Beijing (CN); Qi Wu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 129 days.

(21) Appl. No.: 16/236,282

(22) Filed: Dec. 28, 2018

(65) Prior Publication Data
US 2020/0213246 A1    Jul. 2, 2020

(51) Int. Cl.
*G06F 15/167*    (2006.01)
*H04L 12/931*    (2013.01)
*G06F 15/173*    (2006.01)

(52) U.S. Cl.
CPC ...... *H04L 49/208* (2013.01); *G06F 15/17331* (2013.01)

(58) Field of Classification Search
CPC .................. H04L 49/208; G06F 15/17331
See application file for complete search history.

(56) References Cited

U.S. PATENT DOCUMENTS

| | | | |
|---|---|---|---|
| 10,432,426 B2 | 10/2019 | Wang et al. | |
| 2008/0281699 A1 | 11/2008 | Whitehead | |
| 2011/0022729 A1 | 1/2011 | Eisenhauer et al. | |
| 2014/0098822 A1* | 4/2014 | Galles | H04L 49/208 370/412 |
| 2014/0280211 A1 | 9/2014 | Rash et al. | |
| 2015/0003457 A1 | 1/2015 | Sugiyama et al. | |
| 2017/0085502 A1 | 3/2017 | Biruduraju | |
| 2018/0241610 A1* | 8/2018 | Wang | H04L 41/0806 |

* cited by examiner

*Primary Examiner* — Hua Fan
(74) *Attorney, Agent, or Firm* — Su IP Consulting

(57) ABSTRACT

Example methods are provided for port mirroring based on remote direct memory access (RDMA) in a software-defined networking (SDN) environment. One example method may comprise obtaining configuration information associated with a port mirroring session between a source logical port supported by a source host and a destination logical port supported by a destination host, and establishing an RDMA-based connection between the source and destination hosts. The method may also comprise: in response to detecting a packet passing through the source logical port, generating a mirrored packet based on the detected packet, and storing, in source memory associated with the source host, the mirrored packet in association with destination information identifying the destination logical port or destination host. The method may further comprise transferring the mirrored packet from the source memory to destination memory associated with the destination host via the RDMA-based connection.

21 Claims, 5 Drawing Sheets

PORT MIRRORING BASED ON REMOTE DIRECT MEMORY ACCESS (RDMA) IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, port mirroring is a switch feature that may be configured between a pair of ports for the purpose of traffic monitoring, analysis, etc. During a port mirroring session, packets passing through one port are mirrored and sent to another port. However, conventional approaches for port mirroring might lack efficiency and scalability, which is undesirable.

DETAILED DESCRIPTION

Figure 1:
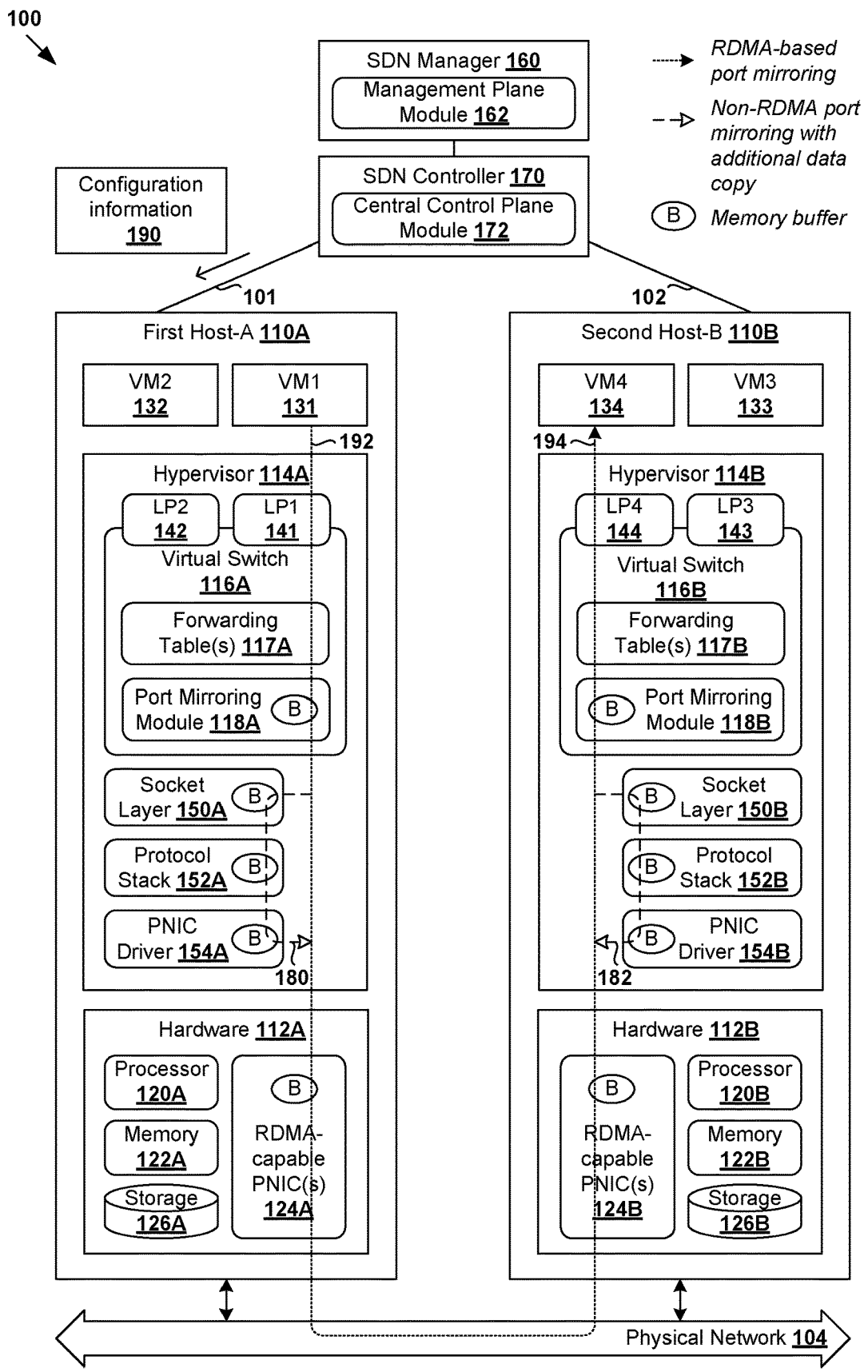
FIG. 1 is a schematic diagram illustrating an example Software-Defined Networking (SDN) environment in which port mirroring based on remote direct memory access (RDMA) may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to port mirroring will now be explained in more detail using FIG. 1, which is a schematic diagram illustrating example software-defined networking (SDN) environment 100 in which port mirroring based on remote direct memory access (RDMA) may be implemented. It should be understood that, depending on the desired implementation, SDN environment 100 may include additional and/or alternative components than that shown in FIG. 1.

In the example in FIG. 1, SDN environment 100 includes multiple hosts, such as host-A 110A and host-B 110B that are inter-connected via physical network 104. Each host 110A/110B includes suitable hardware 112A/112B and virtualization software (e.g., hypervisor-A 114A, hypervisor-B 114B) to support various virtual machines (VMs) 131-134. For example, host-A 110A supports VM1 131 and VM2 132, and host-B 110B supports VM3 133 and VM4 134. In practice, SDN environment 100 may include any number of hosts (also known as a "host computers", "host devices", "physical servers", "server systems", "transport nodes," etc.), where each host may be supporting tens or hundreds of VMs. Hypervisors 114A-B may each implement any suitable virtualization technology, such as VMware ESX® or ESXi™ (available from VMware, Inc.), Kernel-based Virtual Machine (KVM), etc.

Hypervisor 114A/114B maintains a mapping between underlying hardware 112A/112B and virtual resources allocated to respective VMs 131-134. Hardware 112A/112B includes suitable physical components, such as central processing unit(s) (CPU(s)) or processor(s) 120A/120B; memory 122A/122B; physical network interface controllers (PNICs) 124A/124B; and storage disk(s) 126A/126B, etc. Virtual resources are allocated to respective VMs 131-134 to support a guest operating system (OS) and applications (not shown for simplicity). Corresponding to hardware 112A/112B, the virtual resources may include virtual CPU, guest physical memory, virtual disk, virtual network interface controller (VNIC), etc. Hardware resources may be emulated using virtual machine monitors (VMMs). The VMMs may be considered as part of respective VMs 131-134, or alternatively, separated from VMs 131-134. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B further implements virtual switch 116A/116B and a logical distributed router (DR) instance (not shown for simplicity) to handle egress packets from, and ingress packets to, corresponding VMs 131-134. In SDN environment 100, logical switches and logical distributed routers may be implemented in a distributed manner and can span multiple hosts to connect VMs 131-134. For example, logical switches that provide logical layer-2 connectivity may be implemented collectively by virtual switches 116A-B and represented internally using forwarding tables 117A-B at respective virtual switches 116A-B. Forwarding tables 117A-B may each include entries that collectively implement the respective logical switches. Further, logical distributed routers that provide logical layer-3 connectivity may be implemented collectively by DR instances and represented internally using routing tables (not shown for simplicity) at respective DR instances. Routing tables may each include entries that collectively implement the respective logical distributed routers.

Virtual switch 116A/116B also maintains any suitable forwarding information to forward packets to and from corresponding VMs 131-134. Packets are received from, or sent to, each VM via an associated logical port. For example, logical ports 141-144 are associated with respective VMs 131-134. The term "packet" may refer generally to a group of bits that can be transported together, and may be in another form, such as "frame," "message," "segment," "datagram," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 116A-B in the example in FIG. 1, whereas a "virtual switch" may refer generally to a software switch or software implementation of a physical switch. In practice, there is usually a one-to-one mapping between a logical port on a logical switch and a virtual port on virtual switch 116A/116B. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. SDN controller 170 and SDN manager 160 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 160. One example of an SDN manager is the NSX manager component that provides an interface for end users to perform any suitable configuration in SDN environment 100.

SDN manager 160 and SDN controller 170 support management plane (MP) module 162 and central control plane (CCP) module 172, respectively. To interact with SDN controller 170 to send and receive the control information (e.g., configuration information), each host 110A/110B may implement a local control plane (LCP) agent (not shown for simplicity). Control-plane channel 101/102 may be established between SDN controller 170 and host 110A/110B using TCP over Secure Sockets Layer (SSL), etc. Management entity 160/170 may be implemented using physical machine(s), virtual machine(s), a combination thereof, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), Generic Routing Encapsulation (GRE), etc. For example, VXLAN is a layer-2 overlay scheme on a layer-3 network that uses tunnel encapsulation to extend layer-2 segments across multiple hosts. In the example in FIG. 1, VM1 131 on host-A 110A, and VM4 134 on host-B 110B may be located on the same logical layer-2 segment, etc.

Each host 110A/110B also maintains data-plane connectivity with other host(s) via physical network 104 to facilitate communication among VMs located on the same logical overlay network. Hypervisor 114A/114B may implement a virtual tunnel endpoint (VTEP) to encapsulate and decapsulate packets with an outer header (also known as a tunnel header) identifying the relevant logical overlay network. For example in FIG. 1, hypervisor-A 114A implements a first VTEP associated with (IP address=IP-A, MAC address=MAC-A, VTEP label=VTEP-A), and hypervisor-B 114B implements a second VTEP with (IP-B, MAC-B, VTEP-B). Encapsulated packets may be sent via an end-to-end, bi-directional communication path (known as a tunnel) between a pair of VTEPs over physical network 104.

In SDN environment 100, port mirroring may be configured between a pair of logical ports for the purpose of traffic monitoring, analysis, debugging, network diagnostics, etc. In the example in FIG. 1, consider the communication between VM1 131 at host-A 110A and a destination VM supported by a destination host (e.g., VM6 at host-D; not shown for simplicity). In this case, in response to virtual switch 116A detecting egress packets addressed from VM1 131 to the destination VM, the egress packets are forwarded to the destination host via physical network 104.

To provide visibility into the communication between VM1 131 and the destination VM, a port mirroring session may be configured between logical port=LP1 141 (i.e., mirroring source) and logical port=LP4 144 (i.e., mirroring destination) such that LP4 144 also receives a copy of packets passing through LP1 141. During the port mirroring session, virtual switch 116A at host-A 110A mirrors (i.e., duplicates) the egress packets passing through LP1 141, and sends the mirrored packets to host-B 110B. At the port mirroring destination host-B 110B, virtual switch 116B receives and forwards the mirrored packets to LP4 144 and associated VM4 134.

In practice, however, conventional approaches for port mirroring may lack efficiency. For example, to facilitate port mirroring between LP1 141 and LP4 144, it is necessary to perform repetitious operations to copy and read data from memory buffers. In the example in FIG. 1, mirrored packets may be read from a first memory buffer at port mirroring module 118A, and copied to a second memory buffer at socket layer 150A. Next, the mirrored packets are copied to a third memory buffer at transport protocol stack 152A (also known as transport protocol driver), followed by a fourth memory buffer at PNIC driver 154A, and finally a fifth memory buffer at PNIC 124A for subsequent delivery to host-B 110B via physical network 104. The same operations are performed at host-B 110B to forward mirrored packets from PNIC 124B to port mirroring destination=LP4 144. See corresponding conventional datapaths 180 and 182 in FIG. 1. These repetitious operations take valuable resources from CPU 120A of host-A 110A, which is undesirable because CPU 120A has other more critical compute responsibilities.

Further, conventional approaches for port mirroring may lack scalability, especially when many port mirroring sessions are configured and CPU resources are limited. For example, one dedicated thread is generally implemented by port mirroring module 118A/118B to perform encapsulation and decapsulation (e.g., GRE) to handle mirrored traffic through socket layer 150A/150B, protocol stack 152A/152B, PNIC driver 154A/154B, etc. These operations require significant CPU resources, especially when a large amount of traffic is being monitored. In this case, the dedicated thread might be unable to handle the mirrored traffic, which results in packet drops. Also, port mirroring performance may be adversely affected because mirror traffic throughput is limited by the amount of CPU resources.

RDMA-Based Port Mirroring

According to examples of the present disclosure, port mirroring may be implemented in an improved manner using remote direct memory access (RDMA) techniques, or similar thereof. As used herein, the term "RDMA" may refer to approaches that enable direct memory access from the memory of one computer system to the memory of another computer system via an interconnected network. Using RDMA, port mirroring may be performed more efficiently by transferring mirrored packets between source memory associated with source host-A 110A and destination memory associated with destination host-B 110B. This way, intermediate memory buffers at socket layer 150A/150B, protocol stack 152A/152B, PNIC driver 154A/154B, etc., may be bypassed during the port mirroring session. See corresponding 192-194 (RDMA-based port mirroring datapath) compared with 180-182 (non-RDMA-based datapath) in FIG. 1.

Throughout the present disclosure, various examples will be explained using LP1 141 will be used as an example "first" or "source logical port" (i.e., port mirroring source), LP4 144 as example "second" or "destination logical port" (i.e., port mirroring destination or sink), host-A 110A as a "first" or "source host" that supports source VM1 131 and LP1 141, and host-B 110B as a "second" or "destination host" that supports destination VM4 134 and LP4 144. Further, PNIC(s) 124A at host-A 110A will be used as example "first RDMA-capable PNIC(s)," and PNIC(s) 124B at host-B 110B as example "second RDMA-capable PNIC(s)."

Figure 2:
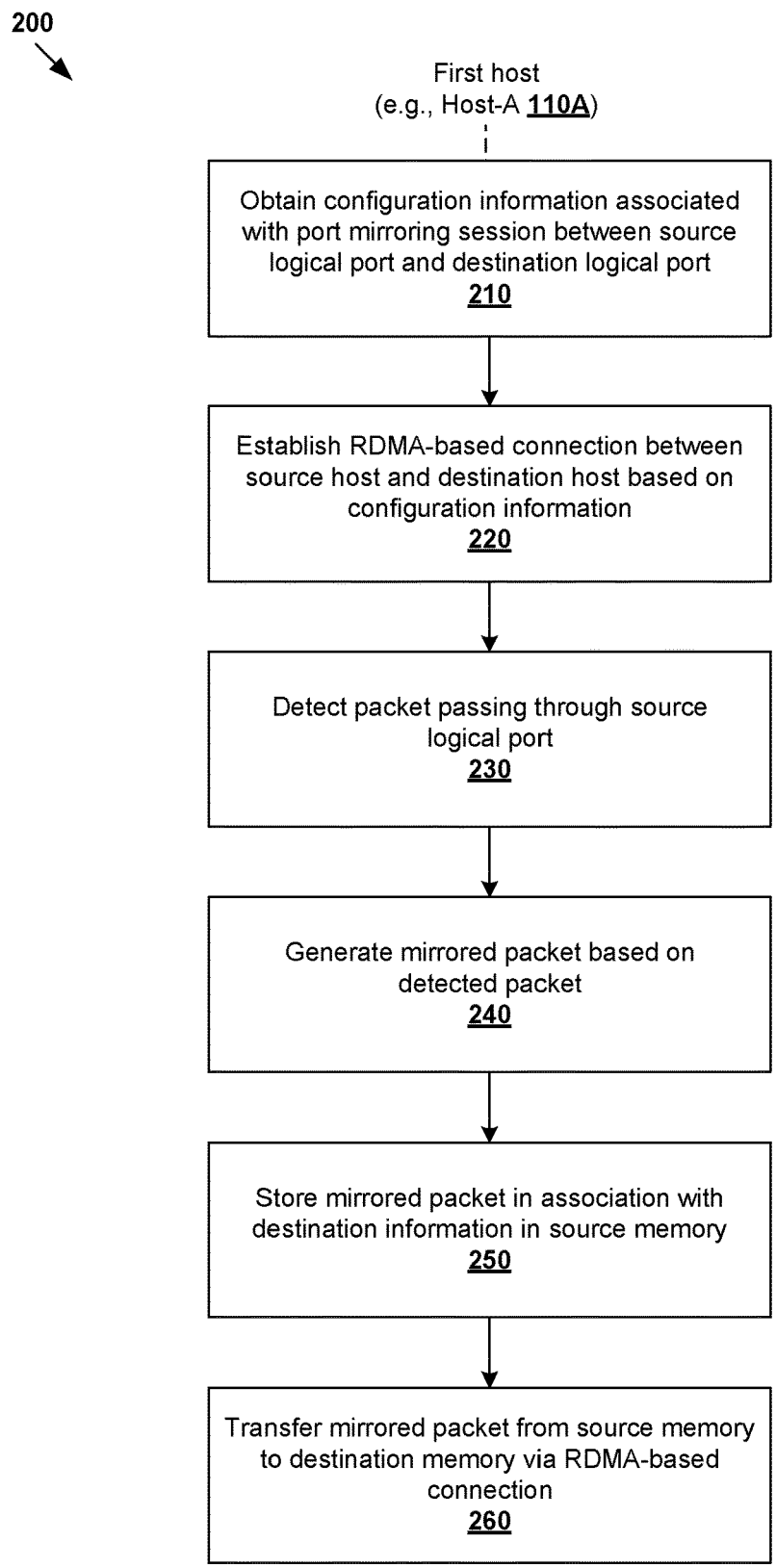
FIG. 2 is a flowchart of an example process for a host to perform port mirroring based on RDMA in an SDN environment.

In more detail, FIG. 2 is a flowchart of example process 200 for a host to perform port mirroring based on RDMA in SDN environment 100. Example process 200 may include one or more operations, functions, or actions illustrated by one or more blocks, such as 210 to 250. The various blocks may be combined into fewer blocks, divided into additional blocks, and/or eliminated depending on the desired implementation. In practice, example process 200 may be implemented by any suitable computer system capable of acting as host 110A/110B, such as using virtual switch 116A/116B, port mirroring module 118A/118B, RDMA-capable PNIC(s) 124A/124B, etc.

At 210 in FIG. 2, source host-A 110A obtains configuration information associated with a port mirroring session between source logical port LP1 141 supported by source host-A 110A and destination logical port LP4 144 supported by destination host-B 110B. The configuration information (see 190 in FIG. 1) may be received or retrieved from any suitable source, such as SDN controller 170.

At 220 in FIG. 2, based on the configuration information, an RDMA-based connection is established between source host-A 110A and destination host-B 110B. The term "RDMA-based connection" may refer to a communication session between two computer systems (e.g., hosts) using an RDMA protocol. As will be discussed further using FIG. 3, any suitable RDMA protocol may be used to establish RDMA-based connections, such as RDMA over converged Ethernet (RoCE) version 1, 2 or any other version, InfiniBand® (IB, a trademark of the InfiniBand Trade Association), RDMA over TCP/IP (iWARP), Virtual Interface Architecture (VIA), Omni-Path (a trademark of the Intel Corporation), etc.

At 230 and 240 in FIG. 2, in response to detecting a packet being forwarded via the source logical port, source host-A 110A generates a mirrored packet based on the detected packet. At 250 in FIG. 2, source host-A 110A stores, in source memory associated with source host-A 110A, the mirrored packet in association with destination information identifying destination logical port LP4 144 and/or destination host-B 110B. This way, at 260 in FIG. 2, the mirrored packet may be transferred from the source memory to destination memory associated with destination host-B 110B via the RDMA-based connection for subsequent forwarding to destination logical port LP4 144.

In practice, the "source memory" may be mirroring-dedicated virtual memory allocated to source port mirroring module 118A or virtual switch 116A at host-A 110A. Similarly, the "destination memory" may be mirroring-dedicated virtual memory allocated to destination port mirroring module 118B or virtual switch 116B at host-B 110B. For example, block 250 may involve port mirroring module 118A invoking a send operation (e.g., rdma_post_send( )) to push the mirrored packet from the source memory accessible by port mirroring module 118BA to a memory buffer accessible by source RDMA-capable NIC 124A.

The data transfer at block 260 may be performed using source RDMA-capable NIC(s) 124A, and destination RDMA-capable NIC(s) 124B. As used herein, the term "RDMA-capable NIC" may refer generally to any suitable network adapter that is capable of sending or receiving RDMA traffic via the RDMA-based connection. In the following, various examples will be discussed using FIG. 3, FIG. 4 (single destination) and FIG. 5 (multiple destinations).

Configuration

Figure 3:
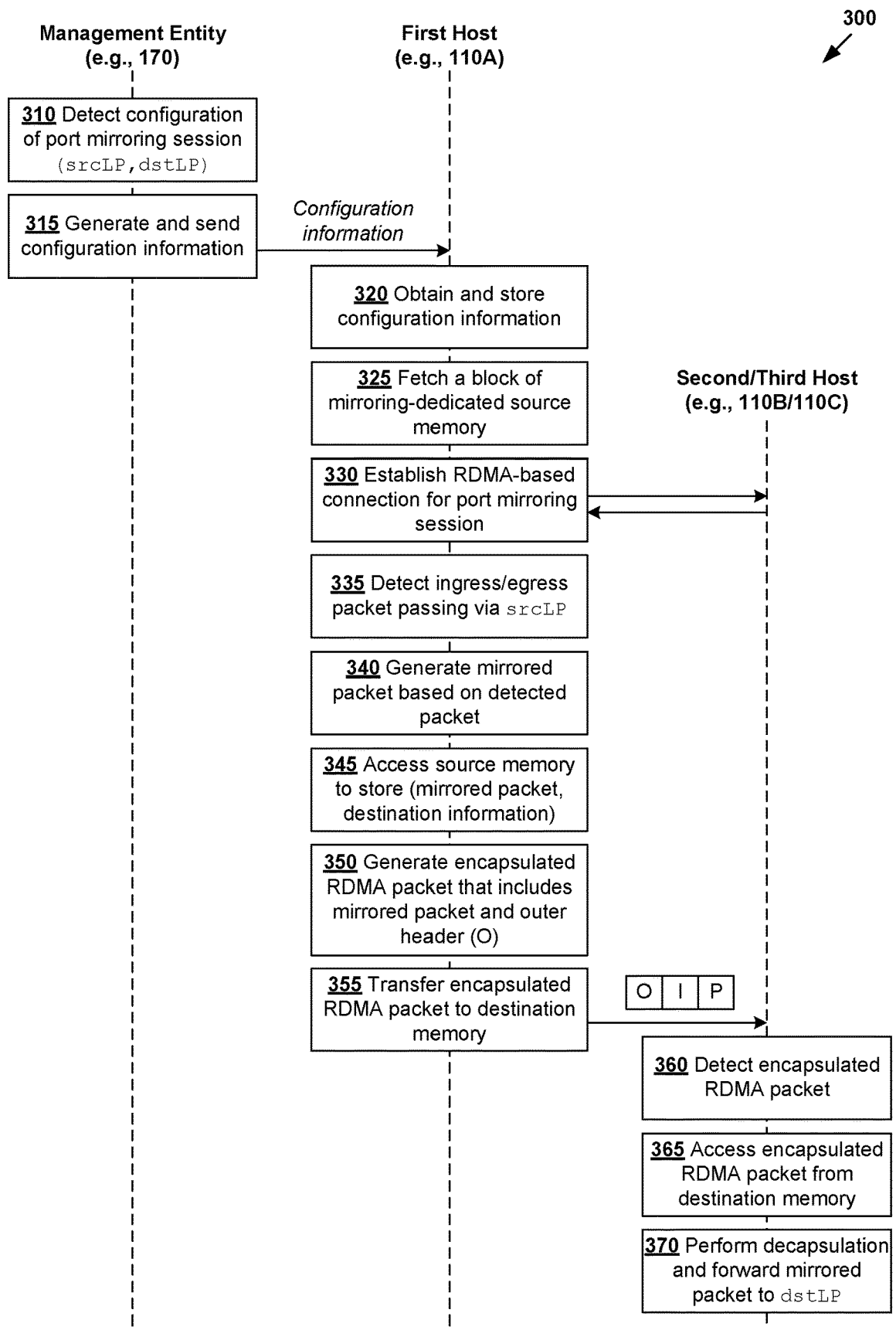
FIG. 3 is a flowchart of an example detailed process for port mirroring based on RDMA in an SDN environment.

FIG. 3 is a flowchart of detailed process 300 for port mirroring based on RDMA in SDN environment 100. Example process 300 may include one or more operations, functions, or actions illustrated by one or more blocks, such as 310 to 370. The various blocks may be combined into fewer blocks, divided into additional blocks, and/or eliminated depending on the desired implementation. In practice, example process 300 may be implemented by any suitable computer system capable of acting as host 110A/110B, such as using virtual switch 116A/116B, port mirroring module 118A/118B, RDMA-capable PNIC(s) 124A/124B, etc.

At 310 in FIG. 3, SDN controller 170 detects configuration of a port mirroring session, such as based on instructions from SDN manager 160, etc. In practice, the configuration may be initiated by a user (e.g., network administrator) via any suitable user interface supported by SDN manager 160 and/or SDN controller 170, such as graphical user interface (GUI), command-line interface (CLI), application programming interface (API) calls, etc. The port mirroring session may be configured with any suitable parameter(s), such as a session ID, session name, port mirroring source logical port, port mirroring destination logical port, type of packets to be mirrored (e.g., ingress and/or egress), packet length (in bytes), sampling rate, etc.

Depending on the desired implementation, any suitable port mirroring session type may be configured, such as local Switched Port Analyzer (SPAN), logical SPAN, Encapsulated Remote Switched Port Analyzer (ERSPAN), Remote Switched Port Analyzer (RSPAN), etc. Using local SPAN, both the port mirroring source and destination are on the same host. Using logical SPAN, both the port mirroring source and destination may be on different hosts that communicate via an overlay network (e.g., GENEVE). ERSPAN is a cross-hypervisor approach that supports port mirroring among arbitrary logical ports supported by different virtual switches on different hosts.

Figure 4:
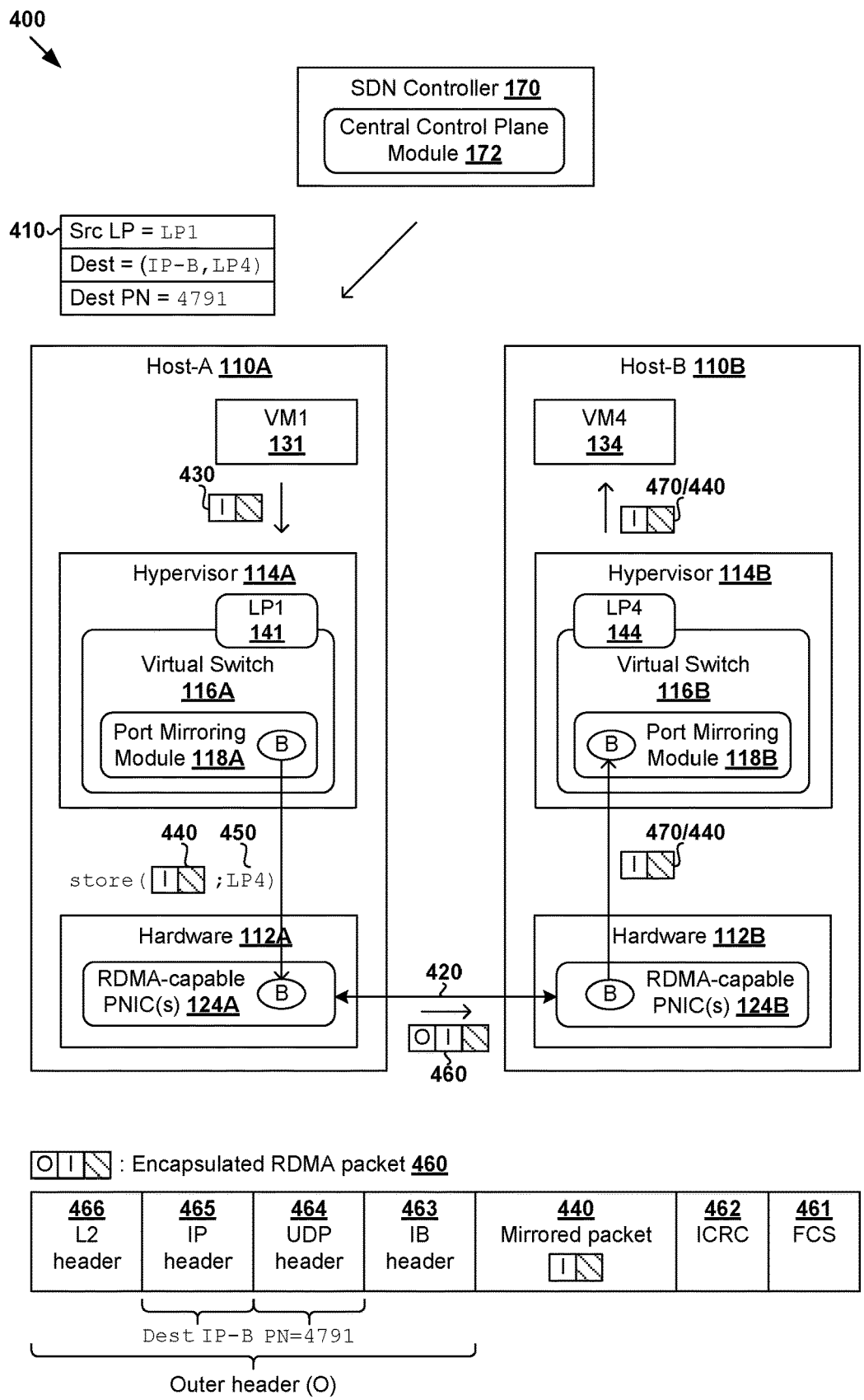
FIG. 4 is a schematic diagram illustrating an example of port mirroring based on RDMA in an SDN environment with one port mirroring destination according to the example in FIG. 3.

The example in FIG. 3 will be explained using FIG. 4, is a schematic diagram illustrating example 400 of port mirroring based on RDMA in SDN environment 100 with one port mirroring destination according to the example in FIG. 3. In the example in FIG. 4, a port mirroring session may be configured between port mirroring source=LP1 141 on host-A 110A and port mirroring destination=LP4 144 on host-B 110B. The packets to be mirrored may be egress packets from VM1 131 (as shown in FIG. 1), ingress packets destined for VM1 131 (not shown for simplicity), or both. In practice, a port mirroring session may involve one or multiple source logical ports, and one or multiple destination logical ports (to be discussed using FIG. 5).

At 315 in FIG. 3, SDN controller 170 configures the port mirroring session by sending or pushing configuration information (i.e., mirroring session information) to host-A 110A. For example in FIG. 4, configuration information 410 identifies source logical port=LP1 141 (denoted as "srcLP" in FIG. 3), destination logical port=LP4 144 (denoted "dstLP" in FIG. 3), destination VTEP IP=IP-B, destination UDP port number=4791. Depending on the desired implementation, configuration information may be sent to the destination host-B 110B. In the example in FIG. 4, the UDP destination port number 4791 has been reserved for RoCEv2 at host 110A/110B.

As discussed using FIG. 1, any suitable RDMA protocol may be used, such as RoCE, (IB), (iWARP), etc. IB is a computer networking communications standard used in high-performance computing that features relatively high throughput and low latency. RoCE is a networking protocol that allows RDMA over an Ethernet network. RoCE version 1 (RoCEv1) is an Ethernet link layer protocol that allows communication between any two hosts on the same Ethernet broadcast domain. RoCE version 2 (RoCEv2) is an IP-based protocol that allows communication via a layer-3 network. Compared with IB, RoCEv2 generally costs less to implement because it is not necessary to update various component(s) to learn a new protocol. Compared with iWARP, RoCEv2 may provide better performance and lower cost. Compared with RoCEv1, RoCEv2 allows packet encapsulation that includes IP and UDP headers supported across both layer-2 and layer-3 networks. This enables layer-3 routing based on VTEP configuration, and port mirroring sessions for logical ports located on different physical hosts and logical switches. In the following, various examples will be discussed using RoCEv2. It should be understood that any alternative and/or additional protocol may be used.

At 320 in FIG. 3, in response to obtaining configuration information 410 from SDN controller 170, source host-A 110A stores configuration information 410. At 325 in FIG. 3, source host-A 110A (e.g., using port mirroring module 118A) fetches a memory block from mirroring-dedicated source memory to facilitate an RDMA-based port mirroring session. Here, the "mirroring-dedicated" source memory may be virtual memory allocated to virtual switch 116A to store data (e.g., packets) relating to port mirroring sessions. The memory allocation may be performed automatically in response to detecting virtual switch 116A is activated (e.g., at creation) and port mirroring module 118A is loaded. The fetched memory block may be a fixed-size block. In the example in FIG. 4, the "mirroring-dedicated" source memory may refer generally to memory buffer(s) accessible by port mirroring module 118A to store mirrored packets. For example (to be discussed further below), a send operation may be invoked (e.g., API call=rdma_post_send( )) to push content of the memory into an RDMA memory buffer accessible by source RDMA-capable NIC 124A.

At 330 in FIG. 3, based on configuration information 410, source host-A 110A establishes an RDMA-based port mirroring connection (see 420 in FIG. 4) with destination host-B 110B. RDMA-based connection 420 may be established using any suitable library calls (known as "verbs" library calls). These library calls provide semantic description of a required behavior, and are used for managing control path objects by creating and destroying objects such as send and receive work queue pairs, completion queues and memory regions.

For example, source port mirroring module 118A at host-A 110A may use library call=rdma_connect( ) to initiate a connection request with destination port mirroring module 118B at host-B 110B. In response, host-B 110B may accept the connection request using rdma_bind( ), rdma_listen( ), rdma_accept( ), etc. RDMA-based connection 420 may be established over an overlay network, such as on top of a VTEP network connecting hosts 110A-B, etc. RDMA-based connection 420 may be supported by a connection-based (e.g., TCP) or connection-less (e.g., UDP) transport layer protocol.

RDMA-Based Port Mirroring Session

Once RDMA-based connection 420 is established, port mirroring may be performed via RDMA-based connection 420. Operations performed by source host 110A and destination host 110B will be discussed in turn below.

(a) Port Mirroring Source

At 335 and 340 in FIG. 3, in response to detecting packet 430 passing through port mirroring source=LP1 141 during the port mirroring session, port mirroring module 118A at host-A 110A generates mirrored packet 440 (i.e., duplicate or copy) based on packet 430. It should be understood that packet 430 will be encapsulated and sent to its destination as usual, and independent of the port mirroring session.

At 345 in FIG. 3, port mirroring module 118A directly accesses mirroring-dedicated source memory directly to store mirrored packet 440 in association with destination information 450 identifying destination logical port=LP4 144 and/or destination host-B 110B. In the example in FIG. 4, mirrored packet 440 is stored in association with ID="LP4" identifying LP4 144. Mirrored packet 440 is directly transferred from a memory buffer at port mirroring module 118A to an RDMA memory buffer at RDMA-capable NIC 124A. This way, intermediate memory buffers at hypervisor 114A may be bypassed to improve efficiency, including buffers at respective socket layer 150A, protocol stack 152A, PNIC driver 154A, etc.

For example, port mirroring module 118A may invoke any suitable send operation to copy mirrored packet 440 from its memory buffer to the memory buffer associated with RDMA-capable NIC 124A, thereby bypassing the intermediate memory buffers. In practice, an example send operation may be invoked using API call=rdma_post_send( ) using various arguments, such a reference to a communication ID of a memory buffer, user-defined context parameter (s), an address of the memory buffer, a length of the memory buffer, registered memory region associated with the memory buffer, flags to control the send operation, any combination thereof, etc.

At 350 in FIG. 3, based on destination information 450, encapsulated RDMA packet 460 is generated. Encapsulated RDMA packet 460 includes mirrored packet 440 (i.e., packet payload) and RDMA-related headers and fields. Using RoCEv2 for example, encapsulated packet 460 may include frame check sequence (FCS) 461 and Invariant Cyclic Redundancy Code (ICRC) 462. FCS 461 is a CRC for detecting any in-transit corruption data of an Ethernet frame. ICRC 462 is a CRC error detecting code that covers all fields of the packet that are invariant from end to end through all switches and routers on the network. Encapsulated RDMA packet 460 further includes various outer headers, such as IB architecture (IBA) transport header 463, UDP header 464 that identifies UDP port number=4791 for RoCEv2, IP header 465 and Ethernet header 465. IP header 465 includes information identifying source VTEP IP=IP-A associated with host-A 110A, and destination VTEP IP=IP-B associated with host-A 110B. Encapsulated RDMA packet 460 also identifies destination logical port=LP4 144 to facilitate packet forwarding to destination host-B 110B. Encapsulated RDMA packet 460 may be generated by using an RDMA module at RDMA-capable NIC 124A.

At 355 in FIG. 3, encapsulated RDMA packet 460 is transferred to mirroring-dedicated destination memory associated with destination host-B 110B via RDMA-based connection 420. In practice, RDMA-connection 420 may facilitate different types of data transfer operations, such as send, send with invalidate, send with solicited event, send with solicited event and invalidate, RDMA write, RDMA read, terminate, etc. The transfer at block 355 may be based on a push or pull model.

For example, "RDMA write" may be used to push data into remote virtual memory (i.e., push by host-A 110A to destination memory at host-B 110B). In another example, "RDMA read" may be used to "pull" data from remote virtual memory (i.e., pull by host-B 110B from source memory at host-A 110A). A sequence of messages may be sent between host-A 110A and host-B 110B to facilitate the data transfer. Using RoCEv2, encapsulated RDMA packet 460 will be addressed to VTEP IP=IP-B associated with host-B 110B and destination UDP port number=4791.

(b) Port Mirroring Destination

At 360 and 365 in FIG. 3, in response to detecting encapsulated packet 460, mirroring-dedicated destination memory associated with destination host-B 110B is accessed to retrieve encapsulated packet 460. Here, the "mirroring-dedicated" destination memory may be virtual memory allocated to virtual switch 116B to store data (e.g., packets) relating to port mirroring sessions. The memory allocation may be performed automatically when virtual switch 116B is activated (e.g., at creation) and port mirroring module 118B loaded. In response to receiving a packet (e.g., using API call=rdma_post_recv( )), port mirroring module 118B will access the allocated destination memory to retrieve the packet.

At 370 in FIG. 3, decapsulation is performed to remove any RDMA-related headers and fields. Decapsulated packet 470 (i.e., same as mirrored packet 440 generated by source host-A 110A) is then forwarded to destination logical port LP4 144, and subsequently VM4 134. This way, as discussed using FIG. 1, intermediate memory buffers at hypervisor 114B may be bypassed to improve efficiency, including buffers at respective socket layer 150B, protocol stack 152B, PNIC driver 154B, etc. This is also known as zero-copy transfer, where CPU of destination host-B 110B is not involved in the task of copying data from one memory area to another.

Multiple Port Mirroring Destinations

According to examples of the present disclosure, multiple (N) destinations may leverage the same mirroring-dedicated source memory at host-A 110A. Since RDMA supports 1:N mapping, extra packet duplication is not required at port mirroring module 118A. This should be contrasted against conventional approaches that require one copy of packets for each mirroring destination. In this case, if there are N mirroring destinations, port mirroring module 118A will have to create (and encapsulate) N copies of the same packet for their respective destinations, which requires a large amount of CPU resources and is therefore inefficient.

Figure 5:
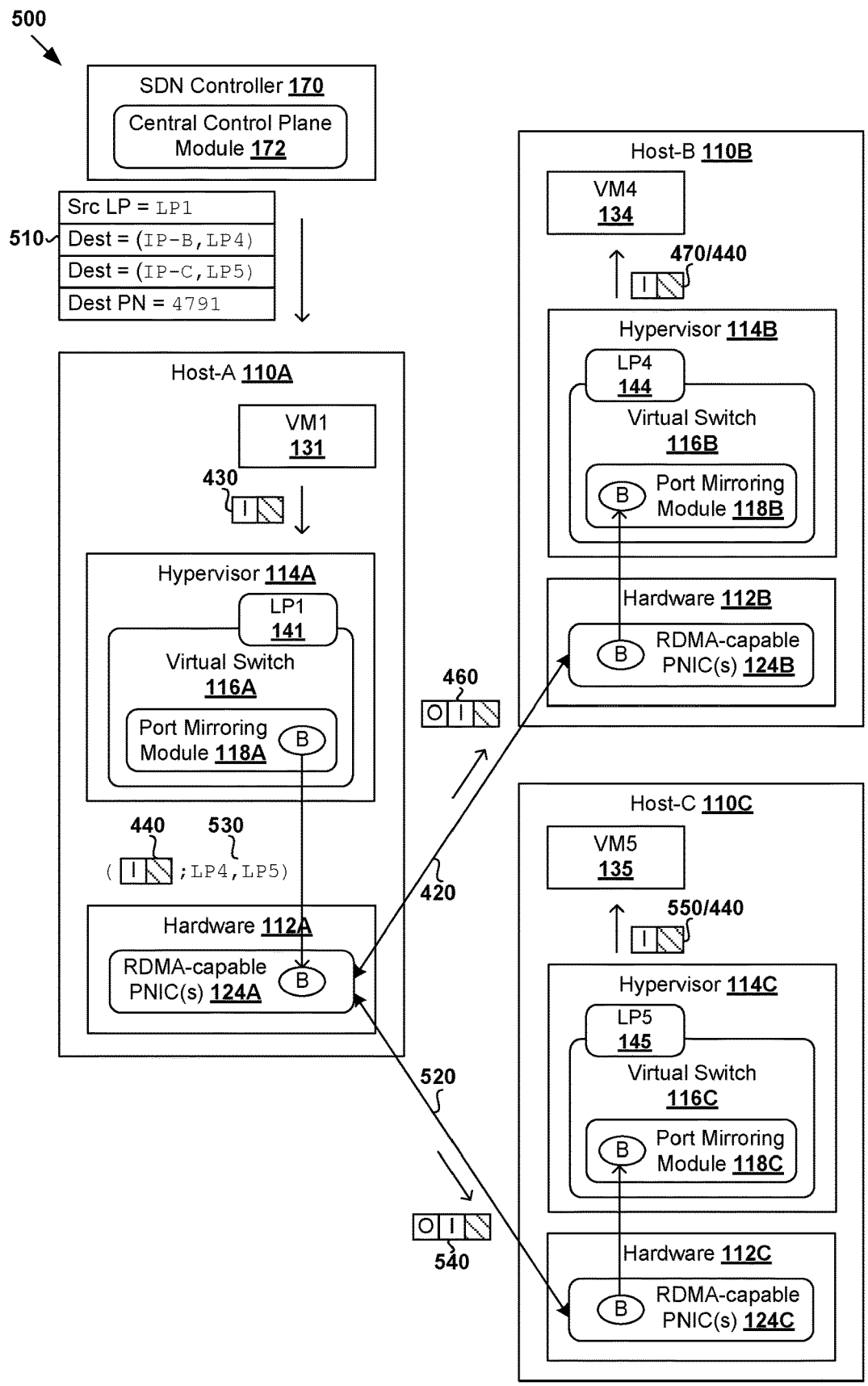
FIG. 5 is a schematic diagram illustrating an example of port mirroring based on RDMA in an SDN environment with multiple port mirroring destinations according to the example in FIG. 3.

An example will be explained using FIG. 5, is a schematic diagram illustrating example 500 of port mirroring based on RDMA in SDN environment 100 with multiple port mirroring destinations. In the example in FIG. 5, a port mirroring session may be configured between port mirroring source=LP1 141 on host-A 110A and multiple port mirroring destinations=LP4 144 on host-B 110B ("first destination host") and LP5 145 on host-C 110C ("second destination host"). Host-C 110C may include various component(s), including virtual switch 116C, port mirroring module 118C, RDMA-capable PNIC 124C, etc. Other hardware and software component(s) similar to host-A 110A/110B will not be repeated here for brevity.

In this case, based on configuration information 510 from SDN controller 170, source host-A 110A establishes first RDMA-based connection 420 with host-B 110B, and second RDMA-based connection 520 with host-C 110C. Configuration information 510 identifies first destination host-B 110B (i.e., VTEP IP-B) and LP4 144, as well as second destination host-C 110C (i.e., VTEP IP-C) and LP5 145. In response to detecting packet 430 passing through LP1 141, port mirroring module 118A generates one copy of mirrored packet 440 according to blocks 335-340 in FIG. 3.

According to block 345 in FIG. 3, port mirroring module 118A then accesses its mirroring-dedicated source memory to store mirrored packet 440 in association with destination information 530, which identifies both LP4 144 and LP5 145. Next, according to blocks 350-355, first encapsulated RDMA packet 460 may be transferred to first destination memory at host-B 110B, and second encapsulated RDMA packet 540 to second destination memory host-C 110C. This way, it is not necessary for port mirroring module 118A to generate and store multiple copies of the same mirrored packet 440. As explained using FIG. 4, first encapsulated RDMA packet 460 includes outer header information identifying destination VTEP IP-B and destination logical port LP4 144 associated with host-B 110B. Similarly, second encapsulated RDMA packet 540 includes outer header information (see 542) identifying destination VTEP IP-C and destination logical port LP5 145 associated with host-C 110C.

According to examples of the present disclosure, it is not necessary to create a dedicated thread to encapsulate mirrored packets 440, or to generate various duplicates of the same packet at port mirroring module 118A. Instead mirrored packets may be stored in the source memory for transfer to the destination memory. Also, various mirroring types may be implemented using RDMA, including SPAN, ERSPAN and RSPAN, etc. The limitations of logical SPAN that necessitate both the port mirroring source and destination to be on the same host may be eliminated.

Container Implementation

Although explained using VMs 131-134, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 5, container technologies may be used to run various containers inside respective VMs 131-134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 5. For example, a computer system capable of acting as host 110A/110B/110C and management entity 160/170 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a source host to perform port mirroring based on remote direct memory access (RDMA) in a software-defined networking (SDN) environment that includes the source host and a destination host, the method comprising:

obtaining configuration information associated with a port mirroring session between a source logical port supported by the source host and a destination logical port supported by the destination host;

based on the configuration information, establishing an RDMA-based connection between the source host and the destination host; and in response to detecting a packet that passes through the source logical port:

generating a mirrored packet based on the detected packet;

storing, in source memory associated with the source host, the mirrored packet in association with destination information that identifies the destination logical port or destination host; and based on the destination information, transferring the mirrored packet from the source memory to destination memory associated with the destination host via the RDMA-based connection to cause the destination host to forward the mirrored packet to the destination logical port.

2. The method of claim 1, wherein storing the mirrored packet comprises:

invoking, by a source port mirroring module supported by the source host, a send operation to push the mirrored packet from the source memory accessible by the source port mirroring module to a memory buffer accessible by a source RDMA-capable network interface controller (NIC) of the source host.

3. The method of claim 1, wherein establishing the RDMA-based port mirroring connection comprises:
sending, from a source port mirroring module supported by the source host, a connection request to establish the RDMA-based connection with a destination port mirroring module supported by the destination host.

4. The method of claim 1, wherein transferring the mirrored packet comprises:
generating an encapsulated packet that includes the mirrored packet and an outer header that includes the destination information.

5. The method of claim 4, wherein transferring the mirrored packet comprises:
transferring the encapsulated packet from a source RDMA-capable NIC at the source host to a destination RDMA-capable NIC at the destination via the RDMA-based connection.

6. The method of claim 1, wherein the destination logical port includes a first destination logical port and the destination host includes a first destination host, and wherein obtaining the configuration information further comprises:
obtaining configuration information that specifies a second destination logical port supported by a second destination host.

7. The method of claim 6, wherein storing the mirrored packet comprises:
storing, in the source memory, the mirrored packet in association with destination information that identifies both (a) the first destination logical port or first destination host, and (b) the second destination logical port or second destination host to facilitate transfer of the mirrored packet to both the first destination host and the second destination host.

8. A non-transitory computer-readable storage medium that includes a set of instructions which, in response to execution by a processor of a computer system, cause the processor to implement a method of port mirroring based on remote direct memory access (RDMA) in a software-defined networking (SDN) environment that includes the source host and a destination host, wherein the method comprises:
obtaining configuration information associated with a port mirroring session between a source logical port supported by the source host and a destination logical port supported by the destination host;
based on the configuration information, establishing an RDMA-based connection between the source host and the destination host; and
in response to detecting a packet that passes through the source logical port:
generating a mirrored packet based on the detected packet;
storing, in source memory associated with the source host, the mirrored packet in association with destination information that identifies the destination logical port or destination host; and
based on the destination information, transferring the mirrored packet from the source memory to destination memory associated with the destination host via the RDMA-based connection for subsequent forwarding to the destination logical port.

9. The non-transitory computer-readable storage medium of claim 8, wherein storing the mirrored packet comprises:
invoking, by a source port mirroring module supported by the source host, a send operation to push the mirrored packet from the source memory accessible by the source port mirroring module to a memory buffer accessible by a source RDMA-capable network interface controller (NIC) of the source host.

10. The non-transitory computer-readable storage medium of claim 8, wherein establishing the RDMA-based port mirroring connection comprises:
sending, from a source port mirroring module supported by the source host, a connection request to establish the RDMA-based connection with a destination port mirroring module supported by the destination host.

11. The non-transitory computer-readable storage medium of claim 8, wherein transferring the mirrored packet comprises:
generating an encapsulated packet that includes the mirrored packet and an outer header that includes the destination information.

12. The non-transitory computer-readable storage medium of claim 11, wherein transferring the mirrored packet comprises:
transferring the encapsulated packet from a source RDMA-capable NIC at the source host to a destination RDMA-capable NIC at the destination via the RDMA-based connection.

13. The non-transitory computer-readable storage medium of claim 8, wherein the destination logical port includes a first destination logical port and the destination host includes a first destination host, and wherein the method further comprises:
obtaining configuration information that specifies a second destination logical port supported by a second destination host.

14. The non-transitory computer-readable storage medium of claim 13, wherein storing the mirrored packet comprises:
storing, in the source memory, the mirrored packet in association with destination information that identifies both (a) the first destination logical port or first destination host, and (b) the second destination logical port or second destination host to facilitate transfer of the mirrored packet to both the first destination host and the second destination host.

15. A computer system capable to act as a source host to perform port mirroring based on remote direct memory access (RDMA) in a software-defined networking (SDN) environment that includes the source host and a destination host, the computer system comprising:
a processor; and
a non-transitory computer-readable medium having stored thereon instructions that, in response to execution by the processor, cause the processor to:
obtain configuration information associated with a port mirroring session between a source logical port supported by the source host and a destination logical port supported by the destination host;
based on the configuration information, establish an RDMA-based connection between the source host and the destination host; and
in response to detecting a packet that passes through the source logical port:
generate a mirrored packet based on the detected packet;
store, in source memory associated with the source host, the mirrored packet in association with destination information that identifies the destination logical port or destination host; and based on the destination information, transfer the mirrored packet from the source memory to destination memory associated with the destination host via the RDMA-based connection for subsequent forwarding to the destination logical port.

16. The computer system of claim 15, wherein the instructions that cause the processor to store the mirrored packet cause the processor to:
invoke, using a source port mirroring module supported by the source host, a send operation to push the mirrored packet from the source memory accessible by the source port mirroring module to a memory buffer accessible by a source RDMA-capable network interface controller (NIC) of the source host.

17. The computer system of claim 15, wherein the instructions that cause the processor to establish the RDMA-based port mirroring connection cause the processor to:
send, from a source port mirroring module supported by the source host, a connection request to establish the RDMA-based connection with a destination port mirroring module supported by the destination host.

18. The computer system of claim 15, wherein the instructions that cause the processor to transfer the mirrored packet cause the processor to:
generate an encapsulated packet that includes the mirrored packet and an outer header that includes the destination information.

19. The computer system of claim 18, wherein the instructions that cause the processor to transfer the mirrored packet cause the processor to:
transfer the encapsulated packet from a source RDMA-capable NIC at the source host to a destination RDMA-capable NIC at the destination via the RDMA-based connection.

20. The computer system of claim 15, wherein the destination logical port includes a first destination logical port and the destination host includes a first destination host, and wherein the instructions that cause the processor to obtain the configuration information cause the processor to:
obtain configuration information that specifies a second destination logical port supported by a second destination host.

21. The computer system of claim 20, wherein the instructions that cause the processor to store the mirrored packet cause the processor to:
store, in the source memory, the mirrored packet in association with destination information that identifies both (a) the first destination logical port or first destination host, and (b) the second destination logical port or second destination host to facilitate transfer of the mirrored packet to both the first destination host and the second destination host.

* * * * *